United States Patent [19]

Munter

[11] Patent Number: 5,144,619
[45] Date of Patent: Sep. 1, 1992

[54] COMMON MEMORY SWITCH FOR ROUTING DATA SIGNALS COMPRISING ATM AND STM CELLS

[75] Inventor: Ernst A. Munter, Kanata, Canada

[73] Assignee: Northern Telecom Limited, Montreal, Canada

[21] Appl. No.: 638,872

[22] Filed: Jan. 11, 1991

[51] Int. Cl.⁵ .................. H04L 12/56; H04Q 11/04
[52] U.S. Cl. ................. 370/60.1; 370/94.2
[58] Field of Search ........ 370/60.1, 60, 94.1, 370/94.2, 58.1

[56] References Cited

U.S. PATENT DOCUMENTS

| | | | |
|---|---|---|---|
| 4,413,337 | 11/1983 | Dauphin et al. | 370/60.1 |
| 4,603,416 | 7/1986 | Servel et al. | 370/60 |
| 4,731,785 | 3/1988 | Ferenc et al. | 370/60 |
| 4,782,478 | 11/1988 | Day, Jr. et al. | 370/60 |
| 4,884,264 | 11/1989 | Servel et al. | 370/60 |
| 4,926,416 | 5/1990 | Weik | 370/60.1 |
| 4,962,499 | 10/1990 | Sennema | 370/60.1 |

Primary Examiner—Douglas W. Olms
Assistant Examiner—H. Kizou
Attorney, Agent, or Firm—Wenderoth, Lind & Ponack

[57] ABSTRACT

In order to handle asynchronous transfer mode (ATM) cells and synchronous transfer mode (STM) words in a single switch, STM words incoming on a channel are accumulated until a desired data block is available and a switch header is then added thereto in order to form an STM switch cell. The header includes routing information and a flag indicating the switch cell comprises STM words. In addition, a switch header is added to each ATM cell incoming on a channel in order to form an ATM switch cell. The header added to ATM cells includes routing information and a flag indicating the cell comprises an ATM cell. The ATM and STM switch cells feed input channels of a common memory switch. An ATM switch cell from a given incoming channel is stored at a memory address and the memory address input to a queue which is assigned to the outgoing channel indicated by the routing information of the switch header of the cell. At the same time, an ATM switch cell intended for an outgoing channel corresponding to the given incoming channel is read out of the switch, stripped of its switch header and passed to the outgoing channel. An STM cell from a given incoming channel is stored at an address indicative of the given incoming channel and, at the same time, a stored STM switch cell from another incoming channel indicated by the routing information of the incoming cell, is read out of the switch.

10 Claims, 6 Drawing Sheets

COMMON MEMORY SWITCH FOR ROUTING DATA SIGNALS COMPRISING ATM AND STM CELLS

BACKGROUND OF THE INVENTION

1. Field of the Invention

This invention relates to a common memory data switch for routing data signals.

2. Description of Related Art

A primary goal in a digital communications network is to connect data sources with desired data destinations. To accomplish this goal, a signal travelling from a source generally must be routed through one or more network switches in order to reach a particular destination. One scheme for realising such network communications involves the creation of digital information cells in the network, each cell comprising a fixed number of bytes comprising a block of data and a header which provides an indication of the destination for the cell. The header of a cell is used by the network switches to appropriately route the cell. Such cells may propagate asynchronously in the network leading to the designation of "asynchronous transfer mode" or ATM for this scheme.

One type of network switch which may be used in an ATM network is a common memory switch. For example, U.S Pat. No. 4,603,416 to Servel issued Jul. 29, 1986 discloses a common memory data switch for routing ATM cells. In Servel, the destination specified by a particular header is dependent upon the particular input channel, that is, a header is not unique between channels. Thus, an indication of the input channel, along with the header, is necessary to completely specify the destination for the cell and, hence, the output channel to which the cell is to be routed in any particular switch.

The switch of Servel has an input circuit coupled to each input channel which collects a serial cell (which may be either an information bearing cell or an idle cell) propagating along the channel. A multiplexer cyclically scans consecutive input circuits to port collected cells from consecutive circuits to a serial to parallel converter. Accordingly, during one cycle of the multiplexer, the converter outputs parallel cells from each input channel in consecutive order. The order of the cells leaving the converter during one cycle of operation thus indicates the input channel number of the cell. This implicit input channel number and the header of the cell are applied to a look-up table which returns a destination channel number and a new header for the cell. The new header is married to the cell and the derived destination channel number is applied to the write enable inputs of a plurality of queues, one of which is assigned to each output channel, in order to write enable the queue assigned to the output channel represented by the destination channel number. The output of a cyclical local clock forms the data input of the queues and, through a multiplexer, also forms the write address input of a buffer memory whose data input is coupled to the output of the series to parallel converter. Consequently, the address of any cell stored in the buffer memory is also stored in a queue assigned to the output channel for which the cell is destined.

The queues assigned to the output channels are cyclically scanned so that they sequentially transmit read addresses to the buffer memory. This causes the buffer memory to output cells intended for consecutive output channels to a parallel to serial converter which ports the cell to the intended output channel by virtue of the position of the cell in the cycle.

While Servel discloses a system for the routing of ATM signals, his system will not handle signals having a different format. Thus, Servel cannot handle synchronous transfer mode (STM) signals. By way of explanation, STM signals are synchronous signals of a fixed length (generally one byte long) having no headers. That is, STM signals do not include leading bytes indicating their destination; instead the synchronous nature of these signals are exploited to permit proper routing of such signals, as will be explained hereinafter. The subject invention seeks to overcome drawbacks present in known data switching systems.

SUMMARY OF THE INVENTION

According to the present invention, there is provided a common memory switch for routing digital information signals on a plurality of switch input channels to selected ones of a like plurality of switch output channels, said signals comprising fixed length digital data cells, each cell comprising either an ATM cell or STM words, a header having routing information, and a flag which indicates the cell includes an ATM cell or STM words, said switch comprising: reception means coupled to a plurality of switch input channels for receiving cells on said switch input channels and for outputting received cells to cell handling means, said cells being output one-by-one; transmission means coupled to a plurality of switch output channels like in number to said plurality of switch input channels and synchronised with said reception means for receiving cells from said cell handling means, one-by-one, and for transmitting each received cell to a switch output channel corresponding with the switch input channel from which said reception means has last output a cell; said cell handling means comprising (i) header reader means coupled to the output of said reception means for reading the header from each cell output by said reception means;

(ii) first cell handling means, including:

first common memory means having a data input responsive to the output of said reception means, for storing cells which comprise ATM cells at memory addresses;

a plurality of queue means equal in number to said plurality of switch output channels, each of said plurality of queue means assigned to one of said switch output channels;

means responsive to said header reader means for, whenever the flag of the header of a given cell read by said header reader means indicates said given cell includes an ATM cell, (1) enabling the one of said plurality of queue means which is assigned to the switch output channel indicated by said routing information of the header of said given cell to store an indication of the memory address at which said given cell is stored and (2) interrogating the one of said plurality of queue means which is assigned to the switch output channel to which said transmission means will transmit a cell for a memory address and for reading from said first common memory means at said memory address; and (iii) second cell handling means, including:

second common memory means having a data input responsive to the output of said reception means for storing each cell which includes STM words at a memory address indicative of the source switch input channel of said each cell;

means responsive to said header reader means when the flag of the header of a given cell read by said header reader means indicates said given cell is a cell which includes STM words, for reading from said second common memory means at a memory address indicated by the routing information of the header of said given cell to said transmission means.

In another aspect, the present invention comprises: a method of switching ATM cells and STM words from a plurality of incoming channels to selected ones of a like plurality of outgoing channels, comprising the steps of: (a) accumulating a pre-defined number of STM words incoming from a channel; (b) adding a header to an accumulation of STM words under step (a) to form a switch cell, said header comprising pre-defined routing information and an indication that the cell comprises STM words; (c) receiving an ATM cell incoming from a channel; (d) adding a header to an ATM cell received under step (c) to form a switch cell, said header comprising routing information and an indication that the cell comprises an ATM cell; (e) for each of said plurality of input channels, determining a corresponding output channel; (f) presenting switch cells one-by-one in an order such that the incoming channel from which each switch cell originates is apparent; (g) where a presented switch cell comprises an ATM cell, (i) storing said presented switch cell in a first common memory means, (ii) storing the address for said presented switch cell in a queue assigned to an outgoing channel indicated by the routing information of the switch header of said presented switch cell and (iii) transmitting to an outgoing channel corresponding to the incoming channel from which said presented cell originates, a switch cell stored in said first common memory means at an address indicated by an entry in the queue assigned to said corresponding outgoing channel; and (h) where a presented switch cell comprises STM words, (i) storing said presented switch cell in a second common memory means at an address indicative of the incoming channel from which said presented cell originates (ii) transmitting to an outgoing channel corresponding to the incoming channel from which said presented cell originates, a switch cell stored in said second common memory means at an address indicted by the routing information of the switch header of said presented switch cell.

BRIEF DESCRIPTION OF THE DRAWINGS

In the figures which describe example embodiments of the invention.

DETAILED DESCRIPTION OF THE PREFERRED EMBODIMENTS

To facilitate an understanding of the common memory data switch of this invention (which permits switching of both STM and ATM signals), known STM and ATM common memory data switches are first described.

Figure 1:
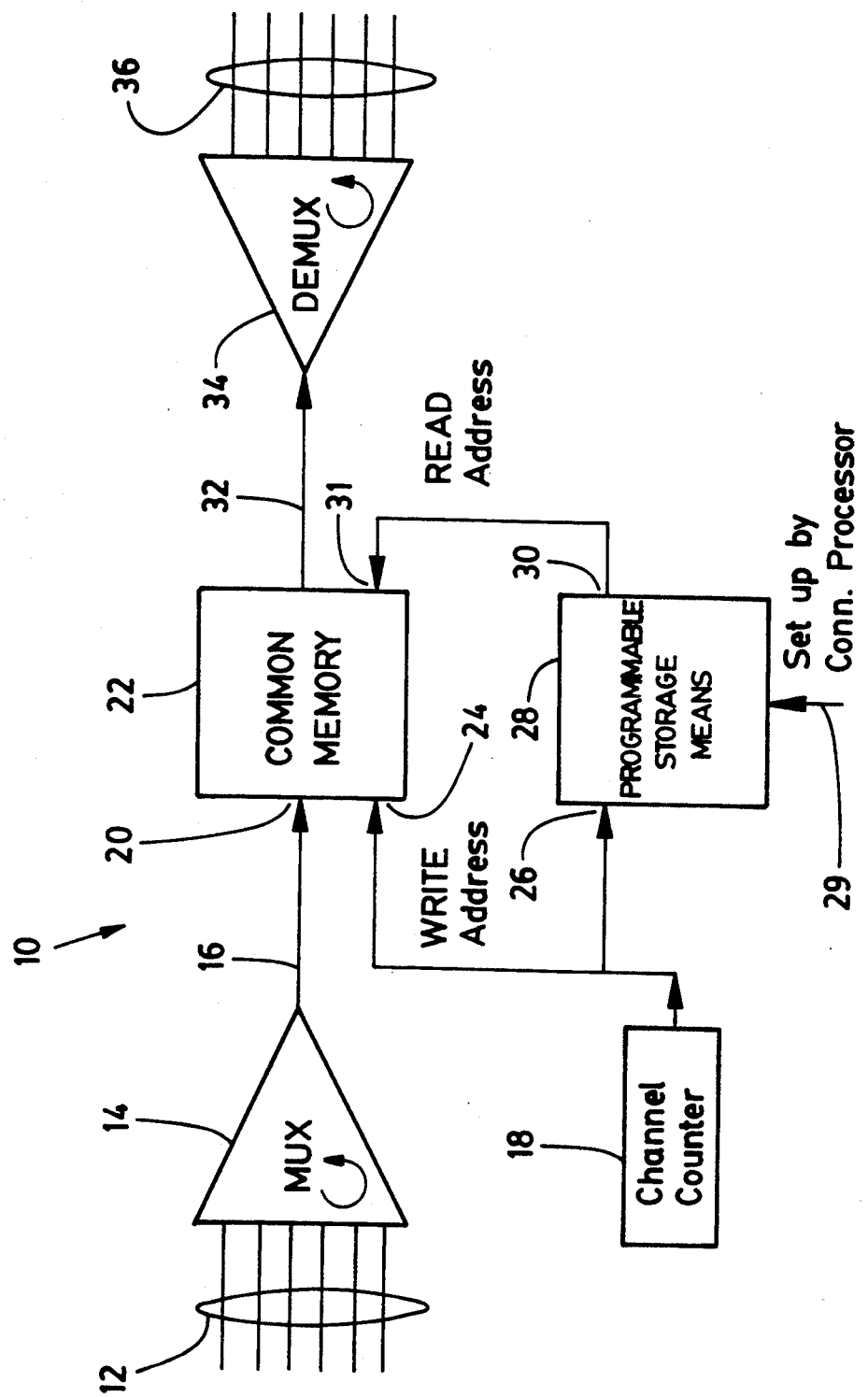
FIG. 1 is a schematic view of a known data switch for STM signals.

FIG. 1 represents a known common memory switch for handling STM signals. Turning to FIG. 1, switch 10 comprises a plurality of switch input channels 12, coupled to a cyclical multiplexer 14. The multiplexer is coupled to the data input 20 of common memory 22 through data bus 16. Bus 32 is coupled between the data output 23 of the common memory and cyclical demultiplexer 34. The demultiplexer is coupled to a plurality of switch output channels 36 equal in number to the plurality of input channels. On power-up of the switch, a channel counter 18 is initialised at "1". The counter overflows after reaching a count equal to the number of switch input channels (and, therefore, output channels). The counter inputs the write address 24 of the common memory 22 and the read address 26 of programmable storage means 28. The storage means is programmed by control signals on line 29 from a control processor (not shown). The data output 30 of the storage means inputs the read address input 31 of the common memory. A system clock (not shown) provides clock signals to each of the multiplexer, data memory, demultiplexer, programmable storage means, and channel counter. The period between consecutive system clock pulses is referred to herein as a "time slot".

In operation, switch 10 receives fixed length serially propagating STM signals on input channels 12. For illustrative purposes, each STM signal is considered to be a data word one byte long. Multiplexing means 14 accumulates a word from each channel and then outputs parallel words from consecutive channels onto bus 16, outputting one parallel word in each time slot. The multiplexer then cyclically repeats this process. Counter 18 increments its count on each pulse from the system clock, and hence increments at the start of a time slot. Consequently, since the count starts at "1" and the counter overflows when it has counted the last channel, the count output by the counter is always representative of the originating channel of the word on the bus 16. For example, when, say, a parallel word from the third channel is placed on the bus, the current count of the counter is "3". The current count on the counter 18 inputs the write address input 24 of the common memory 22 so that the word on bus 16 is written to the address indicated by the count on the counter. Thus, words are stored in memory 22 at addresses indicative of the switch input channel of the word.

The addresses of programmable storage means 28 represent each switch output channel number of the switch 10 and the data contents are programmed by a control processor with the number of an input channel at each such address. Thus the storage means 28 is a look-up table indicating the input channel that is to be connected to each output channel. The counter addresses the storage means so that the data stored in the storage means at the address represented by the current count inputs the read address input of the common memory 22. In effect, the counter specifies a particular output channel number to the storage means and the storage means returns the input channel number that is to be connected to that output channel. Since the common memory stores words at addresses indicative of their input channel numbers, the common memory 22, in response to the read address from the storage means, outputs a word from the input channel which is to be connected to the output channel represented by the current count. Furthermore, demultiplexer 34, which ports words output from the common memory 22 to consecutive output channels (after converting the words back to a serial format) is synchronised with the counter by reason of the system clock and appropriate initialisation. Hence, the input channel words are effectively routed to output channels indicated by the storage means.

It should be noted that it is not possible for words from more than one input channel to be directed to a single output channel since each output channel is only be associated with one input channel through the storage means 28; furthermore, this STM switch cannot accommodate channels of different speeds.

Figure 2:
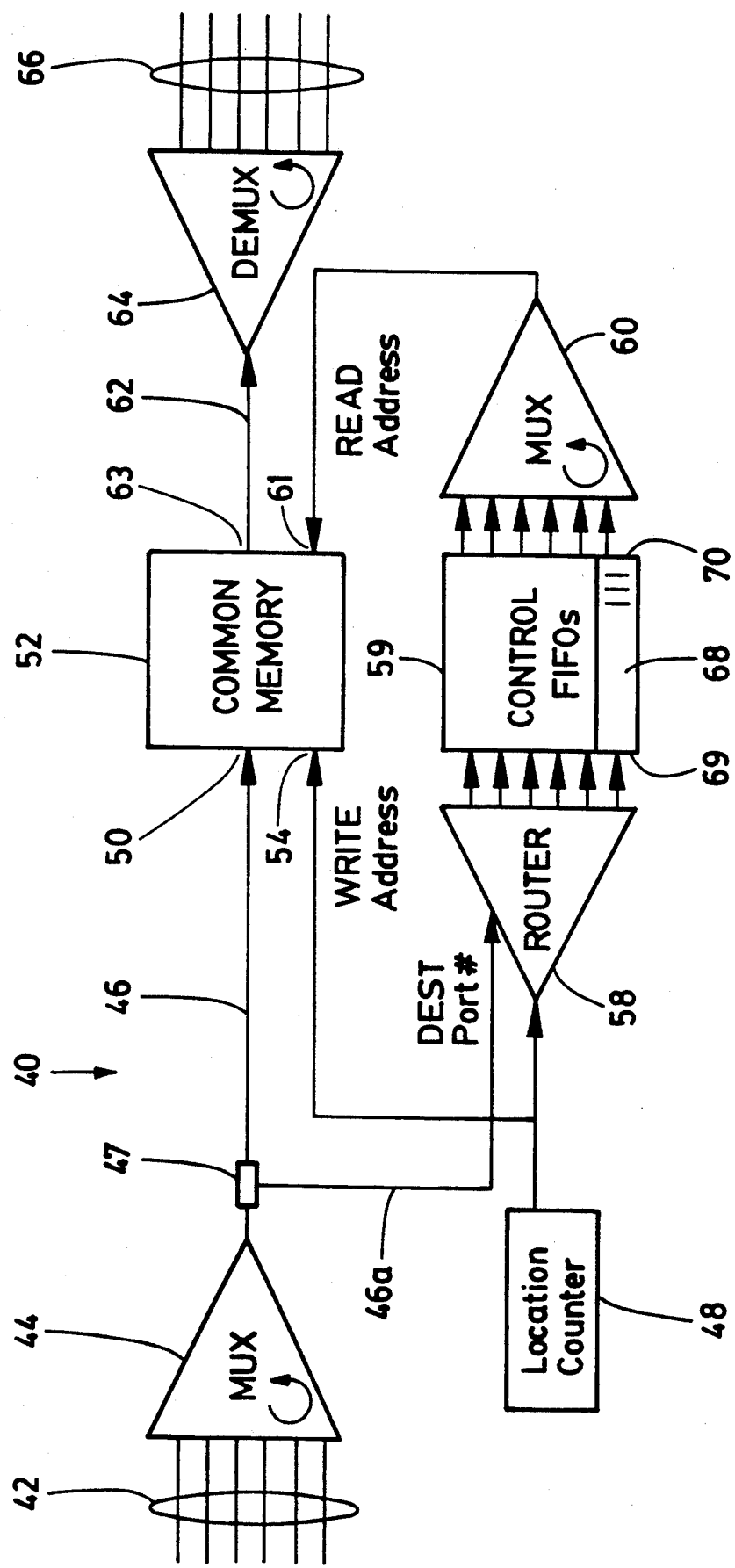
FIG. 2 is a schematic view of a known data switch for ATM signals.

FIG. 2 illustrates a known switch for routing ATM signals (which is similar to the aforereferenced switch to Servel). Each signal is a cell which may be, for example, 64 bytes in length including two bytes of destination information; the header may, optionally, also include other information, such as priority. In FIG. 2, a plurality of switch input channels 42 input cyclical multiplexer 44 of switch 40 to bus 46. Bus 46 inputs data input 50 of common memory 52. Splitter 47 copies the header of any cell on bus 46 to branch 46a which inputs router 58. A location counter 48 inputs the router 58 and the write address input 54 of the common memory 52. The router outputs to control FIFOs 59 which, in turn, output to cyclical multiplexer 60. The control FIFOs comprise a plurality of FIFO queues 68, one assigned to each output channel. The foot 69 of each queue is input from the router and the head 70 of each queue inputs multiplexer 60. In addition, the router inputs the write enable input of each queue (not shown). The multiplexer 60 outputs to the read address input 61 of the memory 52. Bus 62 is coupled between the data output 63 of the memory and cyclical demultiplexer 64. The demultiplexer is also coupled to switch output channels 66; the number of output channels equals the number of input channels. Once again, the system clock (not shown) provides clock pulses to each active element of the switch and the period between two clock pulses is again considered a time slot.

In operation, switch 40 receives serially propagating ATM cells on input channels 42. Multiplexing means 44 accumulates a data cell (or an idle cell) from each channel and then outputs parallel cells from consecutive channels onto bus 46 in response to clock pulses from the system clock, one cell being output during each time slot. It will therefore be noted that while the ATM cells may propagate asynchronously outside of switch 40, the parallel ATM cells in the switch are handled synchronously. On power-up the count on counter 48 is initialised to "1" and the counter is configured to overflow after it has counted some number which is greater than the number of input channels (the number being chosen so that unread data in memory 52 is not overwritten, for reasons which will become more apparent hereinafter). The counter increments in response to the system clock and the current count on the counter 48 inputs the write address input 54 of the memory 52 so that the cell on bus 46 is written to the address indicated by the count on the counter.

The header of each cell, which indicates the intended destination for the particular cell currently being stored in memory 52 (at an address represented by the current count), inputs router 58 on branch 46a. The router uses this destination information to write enable the queue assigned to the intended switch output channel so that such queue reads the current count into its foot. Accordingly, the queue assigned to a particular output channel holds data representing the addresses in memory 52 of cells intended for that particular output channel. By virtue of the system clock and appropriate initialisation, multiplexer 60 is synchronised with demultiplexer 64 so that multiplexer 60 reads a data item from the head of the Nth queue when the demultiplexer has connected the Nth output channel to bus 62. Consequently, when a data item is read from a queue by the multiplexer 60, the data item inputs the read address of memory 52 so that the memory outputs a cell to bus 62 which is intended for the output channel currently connected to the bus by the demultiplexer.

In the switch configuration of FIG. 2, cells from more than one input channel could be intended for a single output channel. In such circumstances, if the counter overflowed after counting the number of input channels, a second entry in memory 52 intended for a particular output channel could be overwritten before it was read. It is for this reason that the counter overflows only after counting a number greater than the number of input channels. The actual number selected for overflow will depend on the maximum anticipated rate of cells queuing for any one output channel.

Idle cells arriving at splitter 47/bus 46, 46a do not contain a valid destination address. One method is to write such idle cells to memory 52 at the write address currently pointed to by the location counter, but this address is not stored in any of the control FIFOs. The location counter is then not incremented, so that the next non-idle cell will overwrite the idle cell in memory 52.

On the output side, it may occur that a control FIFO is empty when MUX 60 is set to retrieve a Read address. In that case, an idle cell should be sent to the channel currently selected by Demux 64. One method of achieving this is to reserve a single location in memory 52 at an address not reached by the location counter (for example, address 0), and store an idle cell there at initialization time. Then, arrange the FIFO logic such that this value (example 0) is output by any FIFO which is empty. This will ensure that an idle cell appears an bus 62 when required.

Figure 3:
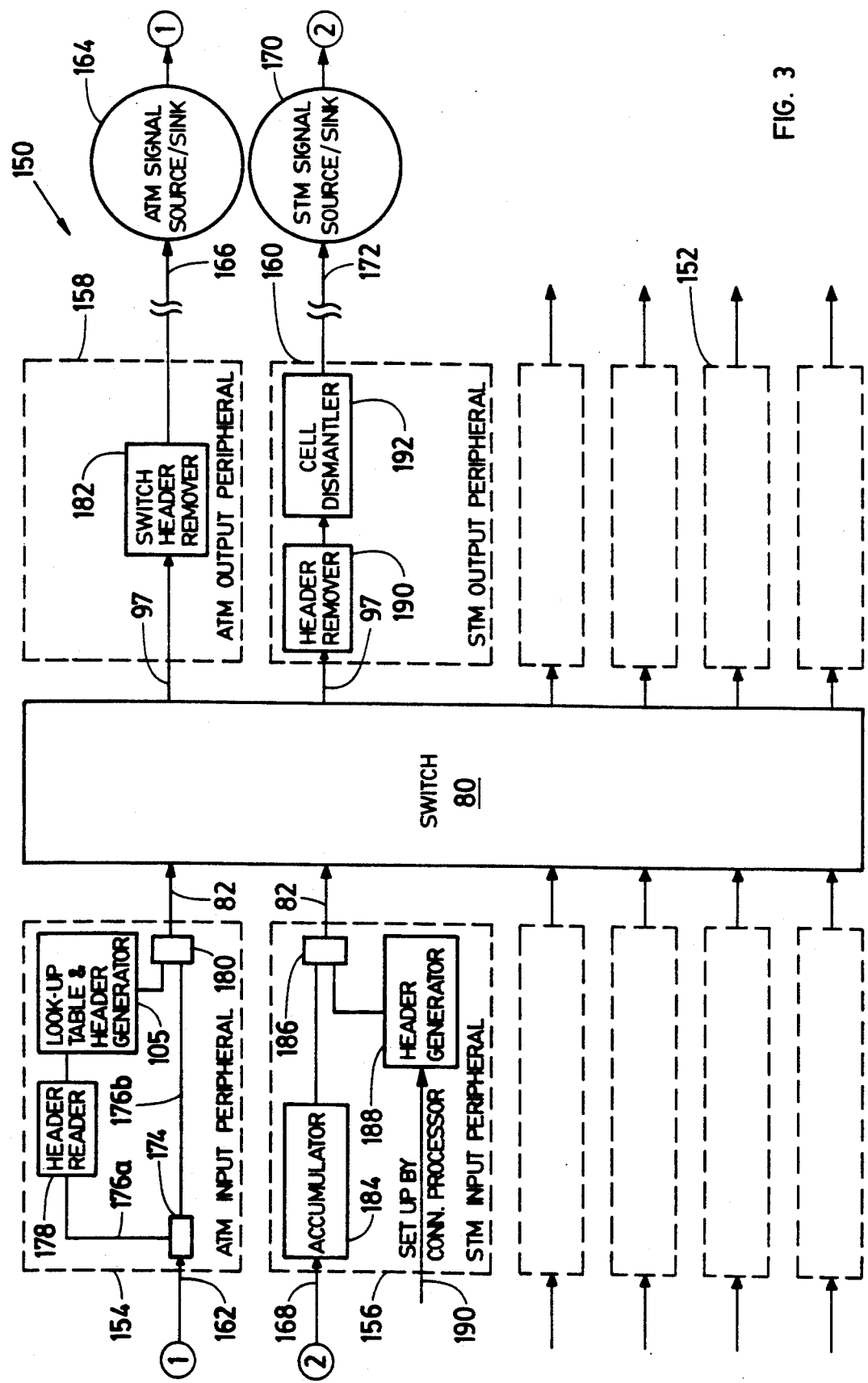
FIG. 3 is a schematic view of a switching system made in accordance with this invention.

FIG. 3 illustrates a switching system 150 made in accordance with this invention. Referring to FIG. 3, the switching system comprises switch 80 and peripherals 152. The peripherals include ATM input peripherals 154 coupled between an incoming channel 162 from an ATM signal source/sink 164 and a switch input channel 82 and ATM output peripherals 158 coupled between a switch output channel 97 and an outgoing channel 166 to an ATM signal source/sink 164. Each ATM signal source/sink connected to an ATM input peripheral is also connected to an ATM output peripheral such that the two peripherals are connected to corresponding switch input and output channels. Thus, for example, if an ATM input peripheral is connected to input channel N, the ATM output peripheral coupled to the same ATM signal source/sink is connected to switch output channel N.

The peripherals further include STM input peripherals 156 coupled between an incoming channel 168 from an STM signal source/sink 170 and a switch input channel 82 and STM output peripherals 160 coupled between a switch output channel 97 and an outgoing channel 172 to an STM signal source/sink 170. Once again, the STM input peripherals and output peripherals form pairs each of which is coupled to one STM signal source/sink and such pairs are connected to corresponding switch input and output channels. As will become apparent hereinafter, the consequence of this correspondence is that the switch 80 accepts a signal originating from a particular source/sink in the same time slot during which the switch transmits a signal to the particular source/sink. Each ATM signal source/sink 164 and STM signal source/sink 170 could be, for example, a piece of data communications equipment (DCE) or one channel from another switching system.

An ATM input peripheral comprises a splitter 174 which is connected between an incoming channel 162 and paths 176a and 176b. Path 176a terminates in header reader 178 and path 176b in one input of combiner 180. The header reader is coupled to look-up table and switch header generator 105 which is coupled to the other input of the combiner 180. The output of the combiner is connected to a switch input channel 82. An ATM output peripheral comprises a switch header remover coupled between a switch output channel 97 (corresponding to the switch input channel of the ATM input peripheral coupled to the same ATM signal source/sink) and an outgoing channel 166.

An STM input peripheral comprises an accumulator 184 connected between an incoming channel 168 and an input of two input combiner 186 and a header generator 188 which receives an input from a connection processor (not shown) on path 190 and outputs to the other input of combiner 186. The combiner outputs to a switch input channel 82. An STM output peripheral comprises a header remover 190 coupled between a switch output channel 97 (corresponding to the switch input channel of the STM input peripheral coupled to the same STM signal source/sink) and the input of cell dismantler 192. The cell dismantler is connected to an outgoing channel 172.

Figure 4:
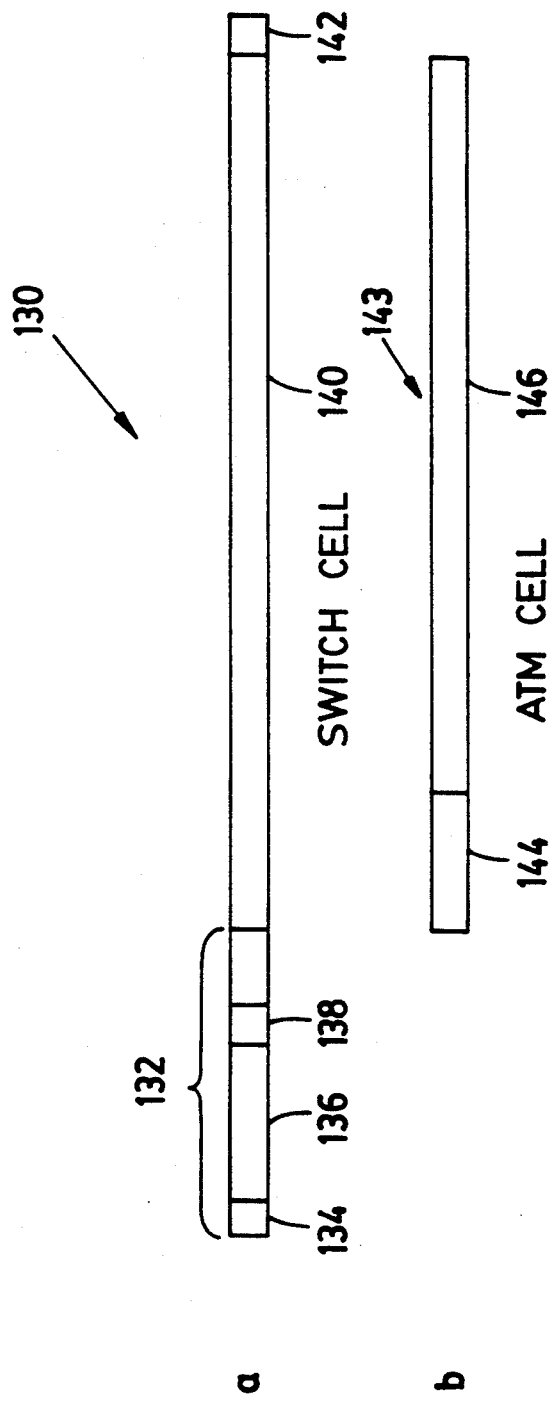
FIG. 4 is a schematic view of an information cell utilized in this invention and a schematic view of a standard ATM cell.

With reference to FIG. 4 as well as FIG. 3, each ATM input peripheral 154 receives ATM cells 143 illustrated in FIG. 4b. These ATM cells comprise a header 144, which includes a connection identifier that indirectly indicates a destination for the cell and a block of data bytes 146. An ATM cell inputting a peripheral 154 on an incoming channel 162 is copied by splitter 174 onto path 176a and 176b. Header reader 178 passes the header 144 from the incoming cell to the look-up table and switch header generator 105 which looks-up header routing bytes 136 (see FIG. 4a) for the cell and outputs a switch header 132 to combiner 180. The switch header includes not only the routing bytes but also a flag byte 134 for indicating the cell is in the nature of an ATM cell and an error checking byte 138. This switch header 132 is then combined with the incoming cell in combiner 180 resulting in the modified cell 130 of FIG. 4. This modified cell propagates to the switch on switch input channel 82. Header 144 of the incoming ATM cell indicates the destination for the cell; the look-up table translates header 144 to routing bytes for switch 80 which indicate (by number) the output channel of the switch to which the cell should be routed in order for it to propagate toward its intended destination. A modified ATM cell 130 leaving switch 80 on a channel 97 is stripped of its switch header 132 by switch header remover 182 of an ATM output peripheral 158 and the resulting outgoing ATM cell, again in the form of cell 143 of FIG. 4, propagates along an outgoing channel 166.

Each STM input peripheral 156 receives STM signals, which may be STM bytes or words, on an incoming channel 168. Accumulator 184 accumulates the STM bytes until a sufficient number are received to make up a data block 140 of the cell 130 of FIG. 4 then the accumulated block is passed to combiner 186. Header generator 188 generates a header 132 which is also passed to the combiner 186 so as to form an STM cell, having the format of the cell 130 of FIG. 4, at the switch input. The header generated by header generator 188 includes a flag byte indicating the cell is in the nature of an STM cell as well as the router bytes which, as will be more apparent hereinafter, identify a switch input channel (by number) from which an STM cell is to be read out from the switch in the time slot in which the newly formed STM cell is read in. The routing bytes 136 are sent to the header generator 188 by a connection processor (not shown) on path 190. As will become more apparent hereinafter, the connection processor therefore controls the routing of STM signals through switch 80.

Header 132 of cell 130 (FIG. 4) may be eight bytes long and, as noted, includes a flag byte 134 for indicating whether the cell is in the nature of an ATM cell or an STM cell, routing bytes 136, and an error checking byte 138. The information block 140 of the cell 130 may be fifty-four bytes long. Optionally, the input peripherals may add an error checking byte 142 to the information block of the cell.

Figure 5:
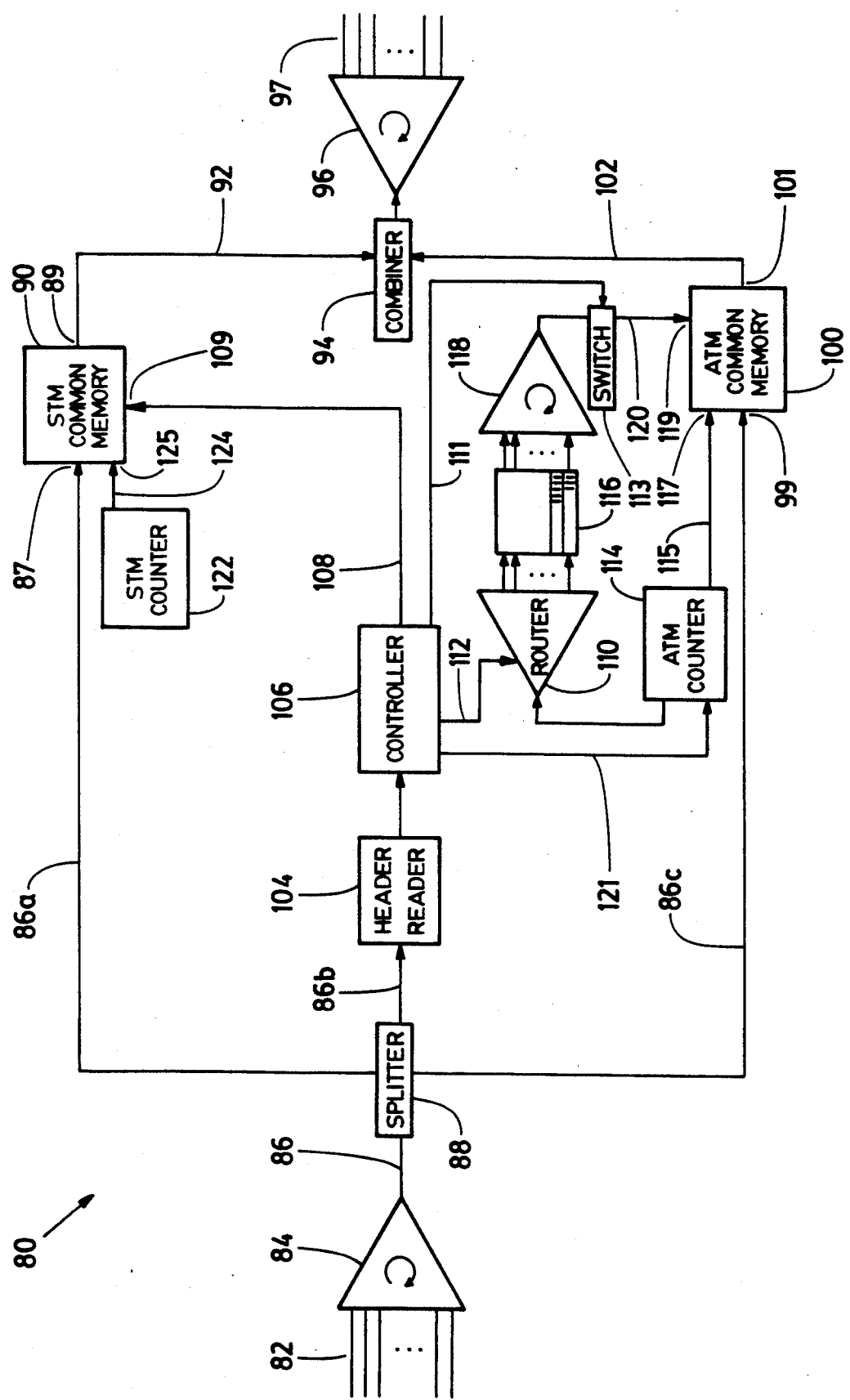
FIG. 5 is a schematic view of a data switch made in accordance with this invention.

Switch 80 is detailed in FIG. 5. Switch input channels 82 are coupled to a reception means which is a cyclical multiplexer 84. Multiplexer outputs to bus 86 which branches at splitter 88 into buses 86a, 86b, and 86c. Bus 86a inputs the data input 87 of STM common memory 90. The data output 89 of this memory is coupled to bus 92 which inputs combiner 94; the combiner inputs a transmission means, namely, cyclical demultiplexer 96 which is coupled to a plurality of switch output channels 97. Bus 86c inputs the data input 99 of ATM common memory 100. The data output 101 of this memory is coupled to the demultiplexer through bus 102 which inputs the combiner 94. Branch 86b of bus 86 inputs header reader 104 which outputs to controller 106. The controller outputs header information either to the write address input 109 of STM common memory 90 on bus 108 or to router 110 on bus 112. Additionally, the controller may output a signal on path 111 to the control input of two-position switch 113. Furthermore, the controller may output a disabling signal to ATM counter 114 on path 121 to permit the handling of idle cells, as will become apparent hereinafter.

ATM counter 114 outputs to the write address input 117 of ATM common memory 100 on bus 115; in addition, the counter outputs to the router 110. The router outputs to the data input and the write enable input of a plurality of queue means 116, one such queue means being assigned to each of the plurality of destination channels 97. The data output of each of the plurality of queue means outputs to a cyclical multiplexer 118 which, in turn, outputs to the read address input 119 of ATM common memory 100 on bus 120 through the data input of two position switch 113.

STM counter 122 outputs to the write address input 125 of STM common memory 90 on bus 124. As before, a system clock provides clock signals to all active elements with the period between adjacent pulses being considered a time slot.

Cells generally propagate serially outside of switching system 150 (of FIG. 3), however, the cells must be in parallel format in switch 80. Accordingly, multiplexer 84 may provide a serial to parallel conversion and demultiplexer 96 may provide a parallel to serial conversion in any convenient manner known to those skilled in the art.

In the operation of the switch of FIG. 5, the switch 80 receives serially propagating cells on switch input channels 82. Multiplexing means 84 accumulates a data cell (or an idle cell) from each channel and then outputs parallel cells from consecutive channels onto bus 86 in response to clock pulses from the system clock, one cell being output during each time slot. During a time slot, a cell on bus 86 is split by splitter 88 so that the cell appears on each branch, 86a, 86b, and 86c of the bus 86. ATM counter 114 and STM counter 122 are both initialised to a count of "1" on power-up. Both counters increment at the beginning of each time slot. ATM counter 114 is configured to overflow after it has counted some number which is greater than the number of input channels 82 and STM counter 122 is configured to overflow after counting the number of switch input channels. The cell on branch 86c is written to the ATM common memory at the address indicated by counter 114 since the counter inputs the write address input of the ATM common memory 100. The cell on branch 86a is written to the address of STM common memory 90 indicated by the count on STM counter 122.

The count output by the STM counter 122 is always representative of the originating input channel 82 of the cell on the branch 86a since this counter overflows after reaching a count equal to the number of switch input channels. Thus, cells are stored in memory 90 at addresses indicative of the originating channel of the cell, and, hence, the source STM input peripheral, and STM signal source/sink, for the cell. There is no such correlation in respect of cells stored in the ATM common memory 100.

Header reader 104 reads the switch header 132 (see FIG. 4) from the cell on branch 86b and passes the header to the controller 106. Controller 106 interrogates flag byte 134 of the header to determine whether the cell is in the nature of an ATM cell or an STM cell. If the cell is an ATM cell the routing bytes are passed to router 110 on bus 112. The router uses the routing bytes to write enable the queue means 116 assigned to the indicated switch output channel so that such queue means reads the current count into its foot. Accordingly, the queue means assigned to a particular output channel holds data representing the addresses in memory 100 of ATM cells intended for that particular switch output channel. Given an ATM cell, the controller also passes a control signal on path 111 which closes switch 113 thus allowing any signal on bus 120 to input the read address input of common memory 100.

By virtue of the system clock and appropriate initialisation, multiplexer 118 is synchronised with demultiplexer 96 so that multiplexer 118 reads a data item from the head of the Nth queue when the demultiplexer has connected the Nth output channel to bus 102. Consequently, when a data item is read from a queue by the multiplexer 118, the data item inputs the read address of memory 100 so that the memory outputs a cell to bus 102 which is intended for the output channel currently connected to the bus by the demultiplexer.

Recall that, in the case of an STM cell, the routing bytes indicate a switch input channel number and, further, that each switch input channel is represented by a location in the STM common memory. If the current cell on the bus 86 is an STM cell, the controller opens switch 113 which blocks the multiplexer 118 from initiating a read operation from the ATM common memory 100. The routing bytes 136 of the header are then passed directly to the read address of common memory 90 on bus 108. This results in the read out of an STM cell from memory 90 which cell originated from the switch input channel indicated by the routing bytes. Thus the routing bytes, in effect, identify an STM input peripheral (and hence an STM signal source/sink) from which an STM cell, previously stored in the switch common memory, is to be read out in the time slot in which the newly formed STM cell (which provided the routing bytes) is read in.

In the switch of FIG. 5, both common memories store all cells input to the switch even though only cells of one type are read out from each. The switch of FIG. 5 could be modified so that only STM cells are stored in the STM common memory and only ATM cells are stored in the ATM common memory, as follows. Controller 106 could disable STM common memory 90 from writing a cell to memory whenever the cell was an ATM cell; the controller would not, however, interfere with the incrementing of STM counter 122. Furthermore, controller 106 could disable ATM common memory 100 from writing a cell to memory whenever the cell was an STM cell and, additionally, block ATM counter 114 from incrementing in such instances.

The switch of FIG. 5 could be further modified to function with only a single common memory. In such case, the first portion of the memory could be reserved for STM cells and the STM counter would address such portion of the memory. The remainder of the memory could be addressed by the ATM counter by simply adding a constant to the count output by the ATM counter before the memory is addressed.

Prior to two signal source/sinks establishing two-way communications, it is necessary for the two to ensure both are free to communicate. Suitable means of accomplishing this are well known to those skilled in the art and are therefore not detailed.

Figure 6:
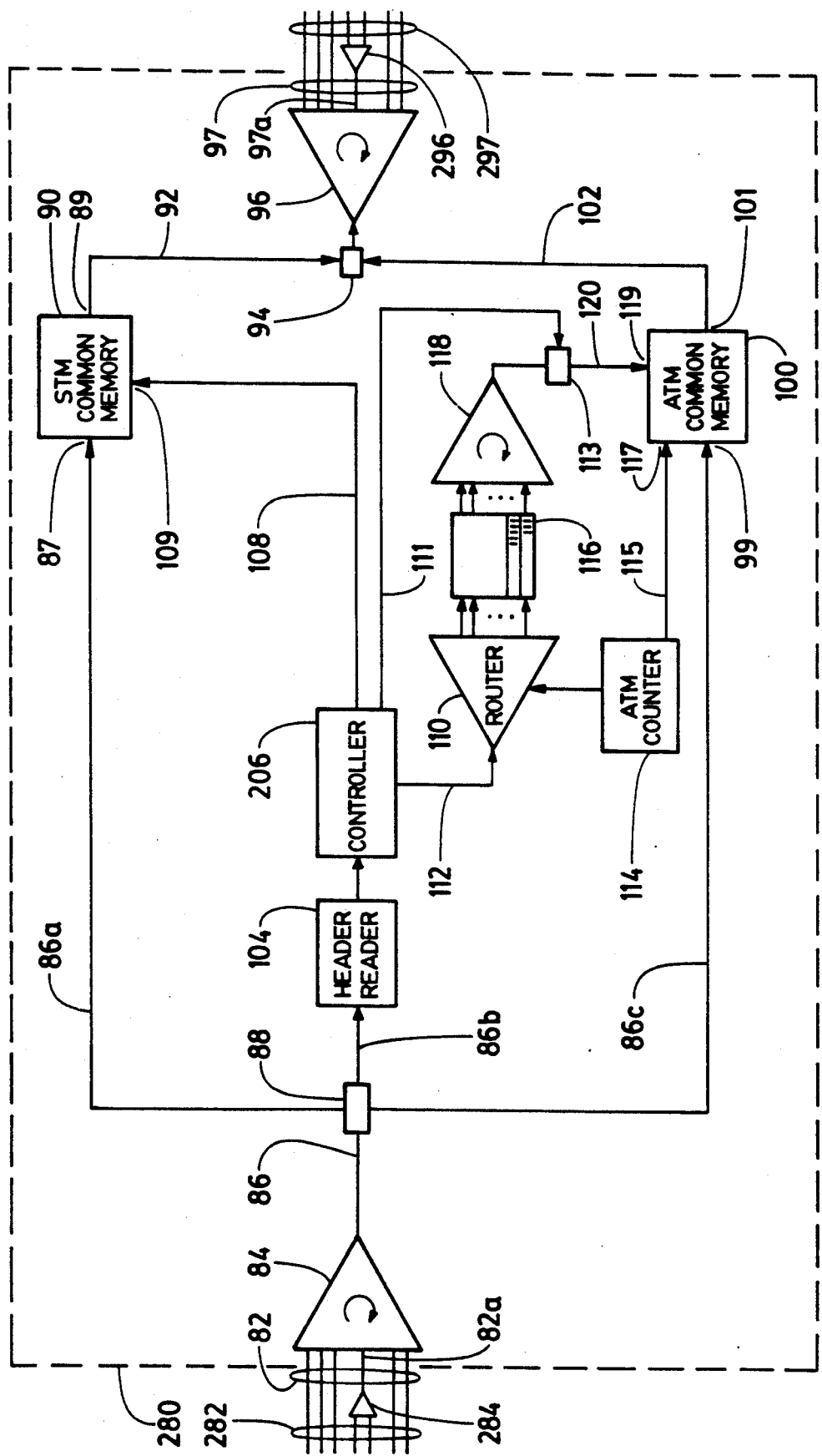
FIG. 6 is a schematic view of a portion of a switching system including another data switch made in accordance with this invention.

FIG. 6 illustrates a portion of a modified switching system including a modified switch 280 made in accordance with this invention which may accommodate STM cells propagating at harmonically related rates. Switch 280 may be used in place of switch 80 in the switching system of FIG. 3 when the information content of the headers of STM cells is modified as follows. For use with switch 280, the routing bytes 136 (FIG. 4) of the header of each STM cell identify the source channel 282 for the cell as well as the source channel 282 from which another STM cell is to be read out from the switch in the time slot in which the first mentioned STM cell is read in. Switch 280 is similar to switch 80 of FIG. 3 and, accordingly, like parts have been designated with like reference numerals. Switch 280 has no STM counter. In the example embodiment of FIG. 6, one of the switch input channels 82a is coupled to the output of cyclical multiplexer 284; the input of multiplexer 284 is coupled to two source channels 282. A corresponding switch output channel 97a is connected to the input of cyclical demultiplexer 296; the output of the demultiplexer is connected to two destination channels 297. Controller 206 of switch 280, is connected in the same manner as in switch 80 of FIG. 3, however, this controller functions somewhat differently, as follows.

In the operation of switch 280 of FIG. 6, source channels 282 which are switch input channels 82, carry cells propagating at a primary channel rate. The two source channels coupled to an input port through multiplexer 284 are intended for STM cells and carry STM cells propagating at a rate which is one-half the primary channel rate. Multiplexer 284 multiplexes these two channels so as to provide a stream of cells at the primary channel rate to switch input channel 82a. Incoming cells are split by splitter 88 and appear on buses 86a, 86b, and 86c. ATM cells are handled by switch 280 in the manner as described in connection with switch 80 of FIG. 5 when modified so that ATM cells are only stored in the ATM common memory and STM cells are only stored in the STM common memory. (This is for the reason that, absent the STM counter, there is no address input to the STM memory when an ATM cell is received and so no way to store ATM cells in the STM common memory.) In the case of an incoming STM cell, the header inputting controller 206 through header reader 104 includes an identifier of the source channel 282 for the cell which identifier is passed to STM common memory 90 on path 108 as the write address for the STM cell on bus 86a. In this way, an STM cell is stored at an address in the STM common memory indicative of its source channel 282. The controller also isolates from the STM header the indication of the source channel 282 from which a cell is to be read in the current time slot and passes this indication to the read address input for the STM common memory 90 on path 108.

Since cyclical multiplexer 84 reads from each switch input channel once each cycle, a cell from one of the two source channels 282 coupled to multiplexer 284 is read into the switch during a given cycle and a cell from the other of the two source channels coupled to multiplexer 184 is read into the switch during the next cycle. Similarly, due to the synchronisation of multiplexer 84 with demultiplexer 96, in a given cycle, a cell is transmitted to the destination channel 297 connected to demultiplexer 296 which corresponds with the source channel 282 from which a cell was read during that cycle.

Where there are N channels supplying STM cells at a rate of 1/N of the primary channel rate, such channels may be accommodated by replacing the two channel multiplexer 284 and demultiplexer 296 with N channel devices, as will be apparent to one skilled in the art. Of course, the switch 280 of FIG. 6 may also be employed without multiplexer 284 and demultiplexer 296 where all source STM channels supply cells at the primary switching rate.

It will be noted that, with the switch of FIG. 6, STM cells from more than one switch input channel could be directed to the same output channel.

An appropriate manner for the handling of idle ATM cells in the switch of FIG. 5 or 6 will be apparent to those skilled in the art. For example, if an incoming cell is an idle ATM cell, the ATM counter may be temporarily disabled by a disabling signal on path 121 from the controller so that the cell is not written to the ATM common memory and the ATM counter is not incremented. If a queue for a particular output channel is empty, an idle cell may be created for that channel either directly on the bus 102 or by reading a prestored (initialized) idle cell from memory 100. Idle STM cells are handled by routing same through the FIG. 5 or FIG. 6 switch.

The links of a data communications network may be optical. This permits the transfer of data between switches at a much greater rate than the speed of data to and from a single device in the network. Thus the optical links between switches may transfer data from a great number of devices in a multiplexed fashion. One standard for such data transfer is known as the SONET standard (Synchronous Optical Network) by way of which cells from numerous channels headed from one switch to another may be formatted and multiplexed for a synchronous transfer. The present invention is suited to inter-switch transfers utilising the SONET standard. Of course, further switch peripherals would be necessary to break the SONET format down so that ATM and STM cells appear at the inputs to the switching system of FIG. 3 and other peripherals would be needed to reconstitute the SONET format at the outputs to the switching system of FIG. 3.

Other modifications within the spirit of this invention will be apparent to those skilled in the art, accordingly, the invention is defined in the claims.

What is claimed is:

1. A common memory switch for routing digital information signals on a plurality of switch input channels to selected ones of a like plurality of switch output channels, said signals comprising fixed length digital data cells, each cell comprising either an ATM cell or STM words, a header having routing information, and a flag which indicates the cell includes an ATM cell or STM words, said switch comprising:

reception means coupled to a plurality of switch input channels for receiving cells on said switch input channels and for outputting received cells to cell handling means, said cells being output one-by-one;

transmission means coupled to a plurality of switch output channels like in number to said plurality of switch input channels and synchronised with said reception means for receiving cells from said cell handling means, one-by-one, and for transmitting each received cell to a switch output channel corresponding with the switch input channel from which said reception means has last output a cell;

said cell handling means comprising
   (i) header reader means coupled to the output of said reception means for reading the header from each cell output by said reception means;
   (ii) first cell handling means, including:
      first common memory means having a data input responsive to the output of said reception means, for storing cells which comprise ATM cells at memory addresses;
      a plurality of queue means equal in number to said plurality of switch output channels, each of said plurality of queue means assigned to one of said switch output channels;
      means responsive to said header reader means for, whenever the flag of the header of a given cell read by said header reader means indicates said given cell includes an ATM cell, (1) enabling the one of said plurality of queue means which is assigned to the switch output channel indicated by said routing information of the header of said given cell to store an indication of the memory address at which said given cell is stored and (2) interrogating the one of said plurality of queue means which is assigned to the switch output channel to which said transmission means will transmit a cell for a memory address and for reading from said first common memory means at said memory address; and (iii) second cell handling means, including:
second common memory means having a data input responsive to the output of said reception means for storing each cell which includes STM words at a memory address indicative of the source switch input channel of said each cell;
means responsive to said header reader means when the flag of the header of a given cell read by said header reader means indicates said given cell is a cell which includes STM words, for reading from said second common memory means at a memory address indicated by the routing information of the header of said given cell to said transmission means.

2. The common memory switch of claim 1 including a counter for providing an incremental count each time a cell is output by said reception means, for overflowing at a count greater than the number of said plurality of switch input channels and for sending an indication of its current count to the write address of said first common memory means so that cells are stored at the memory addresses indicated by said counter and wherein said counter is also for sending an indication of the current count to said means responsive to said header reader means may cause an indication of the current count to be stored in the one of said plurality of queue means assigned to the switch output channel indicated by said routing information of said header.

3. The common memory switch of claim 2 further including a second counter for providing an incremental count each time a cell is output by said reception means, for overflowing at a count equal to the number of said plurality of switch output channels and for sending an indication of its current count to the write address of said second common memory means so that cells are stored at the memory addresses indicated by said second counter and wherein said second counter overflows after counting a number equal to said plurality of switch input channels.

4. The common memory switch of claim 2 wherein the header of a cell, in the case of cells comprising STM words, includes an indication of the source of the cell and including means responsive to the header of a cell comprising STM words for enabling said second common memory means to store such cell at a memory location indicative of the source of such cell comprising STM words.

5. The common memory switch of claim 2 wherein said first common memory means and said second common memory means comprise a single partitioned memory.

6. The common memory switch of claim 1 wherein said reception means includes serial to parallel conversion means for converting incoming cells to parallel format and wherein said transmission means includes parallel to serial conversion means for converting outgoing cells to serial format.

7. A common memory switch for routing digital information signals on a plurality of switch input channels to selected ones of a like plurality of switch output channels, said signals comprising fixed length digital data cells, each cell comprising either an ATM cell or STM words, each cell including a header having routing information and a flag which indicates the cell comprises a collection of STM words or including an ATM cell, comprising:

reception means coupled to a plurality of switch input channels for receiving cells on said switch input channels and for outputting received cells to cell handling means, said cells being output one-by-one from consecutive switch input channels;

transmission means coupled to a plurality of switch output channels like in number to said plurality of switch input channels and synchronised with said reception means for receiving cells from said cell handling means, one-by-one, and for transmitting received cell to consecutive switch output channels;

said cell handling means comprising
(i) header reader means coupled to the output of said reception means for reading the header from each cell output by said reception means;
(ii) ATM cell handling means, including:
ATM common memory means having a data input responsive to the output of said reception means, for storing cells comprising ATM cells at memory addresses;
a plurality of queue means equal in number to said plurality of switch output channels, each of said plurality of queue means assigned to one of said switch output channels;
means responsive to said header reader means for whenever the flag of the header of a given cell read by said header reader means indicates said given cell is a cell comprising an ATM cell (1) enabling the one of said plurality of queue means which is assigned to the switch output channel indicated by said routing information of the header of said given cell to store an indication of the memory address at which said given cell is stored and (2) interrogating the one of said plurality of queue means which is assigned to the switch output channel to which said transmission means will next transmit a cell for a memory address and for reading from said first common memory means at said memory address; and
(iii) STM cell handling means, including:
STM common memory means having a data input responsive to the output of said reception means for storing each cell comprising STM words at a memory address indicative of the source switch input channel of said each cell;
means responsive to said header reader means when the flag of the header of a given cell read by said header reader means indicates said given cell is a cell including STM words for reading from said second common memory means at a memory address indicated by the routing information of the header of said given cell to said transmission means.

8. A common memory switch for routing digital information signals on a plurality of switch input channels to selected ones of a like plurality of switch output channels, said signals comprising fixed length digital data cells comprising a collection of STM words or an ATM cell, each cell including a header having routing information and a flag which indicates the cell comprises a collection of STM words or an ATM cell, comprising:

reception means coupled to a plurality of switch input channels for receiving cells on said switch input channels and for outputting received cells to cell handling means, said cells being output one-by-one from consecutive switch input channels;

transmission means coupled to a plurality of switch output channels like in number to said plurality of switch input channels and synchronised with said reception means for receiving cells from said cell handling means, one-by-one, and for transmitting each received cell to consecutive switch output channels;

said cell handling means comprising
(i) header reader means coupled to the output of said reception means for reading the header from each cell output by said reception means;
(ii) first counter means for providing an incremental count each time a cell is output by said reception means and for overflowing at a count greater than the number of said plurality of switch input channels;
(iii) second counter means for providing an incremental count each time a cell is output by said reception means and for overflowing at a count equal to the number of said plurality of switch output channels;
(iv) ATM cell handling means, including:
ATM common memory means having a data input coupled to said reception means for storing cells at memory addresses indicated by said first counter means;
a plurality of queue means, each of said plurality of queue means assigned to one of said plurality of switch output channels, the data input of each of said plurality of queue means responsive to the count indicated by said first counter means and the data output of said plurality of queue means coupled to the write address input of said ATM common memory means;
means responsive to said header reader means for whenever the flag of the header of a given cell read by said header reader means indicates said given cell is an ATM cell for write enabling the one of said plurality of queue means assigned to the switch output channel indicated by the routing information of the header of said given cell read by said header reader means;
reading means for reading from the one of said plurality of queue means which is assigned to the switch output channel to which said transmission means will next send a cell in order to address said ATM common memory means for initiating read operations from said ATM common memory means to said transmission means;
(v) STM cell handling means, including:
STM common memory means having a data input coupled to said reception means, a write address input coupled to said second counter means for storing each cell received at a memory address indicated by the count on said second counter means;
means responsive to said header reader means when the flag of the header of a given cell read by said header reader means indicates said given cell is a cell comprising STM words, for reading from said STM common memory means at a memory address indicated by the routing information of the header of said given cell to said transmission means.

9. A common memory switching system for routing digital information signals on a plurality of incoming channels to selected ones of a plurality of outgoing channels, said signals comprising fixed length digital data cells, each cell comprising either an ATM cell or STM words, said switching system comprising:

incoming ATM peripheral means for generating switch cells, comprising:
means for receiving an ATM cell;
means for generating a switch header including switch routing information based on the header of the received ATM cell and a flag which indicates ATM information;
means for forming a switch cell from the received ATM cell and said switch header;

incoming STM peripheral means for generating switch cells, comprising:
means for receiving and accumulating a predefined number of STM words;
means for generating a switch header including switch routing information based on a pre-programmed routing indication and a flag which indicates STM information;
means for forming a switch cell from the accumulated STM words and said switch header;

outgoing ATM peripheral means for receiving a switch cell comprising an ATM cell and for stripping the switch header therefrom and for outputting an ATM cell;

outgoing STM peripheral means for receiving a switch cell comprising STM words, for stripping the switch header therefrom and for outputting STM words;

switch means, comprising:
reception means coupled to a plurality of said incoming ATM and STM peripheral means for receiving cells from said plurality of incoming ATM or STM peripheral means and for outputting received cells to switch cell handling means, said cells being output one-by-one;
transmission means coupled to a plurality of outgoing ATM or STM peripheral means like in number to said plurality of incoming ATM or STM peripheral means and synchronised with said reception means for receiving cells from said switch cell handling means, one-by-one, and for transmitting each received cell to an outgoing ATM or STM peripheral means corresponding with the incoming ATM or STM peripheral means from which said reception means has last output a cell;

said switch cell handling means comprising
(i) header reader means coupled to the output of said reception means for reading the header from each cell output by said reception means;
(ii) first switch cell handling means, including:
first common memory means having a data input responsive to the output of said reception means, for storing cells which comprise an ATM cell at memory addresses;

a plurality of queue means equal in number to said plurality of outgoing ATM and STM peripheral means, each of said plurality of queue means assigned to one of said outgoing ATM or STM peripheral means;

means responsive to said header reader means for, whenever the flag of the header of a given switch cell read by said header reader means indicates said given switch cell includes an ATM cell, (1) enabling the one of said plurality of queue means which is assigned to the switch output channel indicated by said routing information of the header of said given switch cell to store an indication of the memory address at which said given switch cell is stored and (2) interrogating the one of said plurality of queue means which is assigned to the outgoing ATM peripheral means to which said transmission means will transmit a cell for a memory address and for reading from said first common memory means at said memory address;

(iii) second switch cell handling means, including:

second common memory means having a data input responsive to the output of said reception means for storing each switch cell which includes STM words at a memory address indicative of the incoming STM peripheral means which was the source of the switch cell;

means responsive to said header reader means when the flag of the header of a given switch cell read by said header reader means indicates said given switch cell is a cell which includes STM words, for reading from said second common memory means at a memory address indicated by the routing information of the header of said given switch cell to said transmission means.

10. A method of switching ATM cells and STM words from a plurality of incoming channels to selected ones of a like plurality of outgoing channels, comprising the steps of:

(a) accumulating a pre-defined number of STM words incoming from a channel;

(b) adding a header to an accumulation of STM words under step (a) to form a switch cell, said header comprising pre-defined routing information and an indication that the cell comprises STM words;

(c) receiving an ATM cell incoming from a channel;

(d) adding a header to an AMT cell received under step (c) to form a switch cell, said header comprising routing information and an indication that the cell comprises an ATM cell;

(e) for each of said plurality of input channels, determining a corresponding output channel;

(f) presenting switch cells one-by-one in an order such that the incoming channel from which each switch cell originates is apparent;

(g) where a presented switch cell comprises an ATM cell, (i) storing said presented switch cell in a first common memory means, (ii) storing the address for said presented switch cell in a queue assigned to an outgoing channel indicated by the routing information of the switch header of said presented switch cell and (iii) transmitting to an outgoing channel corresponding to the incoming channel from which said presented cell originates, a switch cell stored in said first common memory means at an address indicated by an entry in the queue assigned to said corresponding outgoing channel; and (h) where a presented switch cell comprises STM words, (i) storing said presented switch cell in a second common memory means at an address indicative of the incoming channel from which said presented cell originates (ii) transmitting to an outgoing channel corresponding to the incoming channel from which said presented cell originates, a switch cell stored in said second common memory means at an address indicted by the routing information of the switch header of said presented switch cell.

* * * * *

UNITED STATES PATENT AND TRADEMARK OFFICE
CERTIFICATE OF CORRECTION

PATENT NO. : 5,144,619
DATED : September 1, 1992
INVENTOR(S) : Ernst A. Munter

It is certified that error appears in the above-identified patent and that said Letters Patent is hereby corrected as shown below:

column 13, line 34, after "means" insert -- in order that said means responsive to said header reader means --;

column 14, line 6, delete "including" and insert -- includes --;

column 15, line 15, delete "each received cell" and insert -- received cells --;

column 18, line 40, delete "indicted" and insert -- indicated --.

Signed and Sealed this

Fifth Day of October, 1993

Attest:

BRUCE LEHMAN

Attesting Officer    Commissioner of Patents and Trademarks